United States Patent [19]
Frazier

[11] 3,753,409
[45] Aug. 21, 1973

[54] METHOD AND APPARATUS FOR SUBSOIL IRRIGATION

[76] Inventor: Thomas J. Frazier, 2680 Ashford Rd. N.E., Atlanta, Ga. 30319

[22] Filed: July 2, 1971

[21] Appl. No.: 159,223

[52] U.S. Cl......................... 111/6, 47/48.5, 47/58, 239/183, 239/198, 242/86.2, 172/699
[51] Int. Cl............................................. A01c 23/02
[58] Field of Search............................ 47/1, 48.5, 58; 111/6–7, 1; 239/183, 195, 197–199; 242/86.2

[56] References Cited
UNITED STATES PATENTS

| | | | |
|---|---|---|---|
| 3,507,336 | 4/1970 | Nelson | 239/183 |
| 952,607 | 3/1910 | Coplen | 111/7 |
| 3,295,482 | 1/1967 | Dountas et al. | 111/7 |
| 3,150,830 | 9/1964 | Griffith | 239/198 |
| 3,445,066 | 5/1969 | Mohar | 239/197 |
| 3,518,953 | 7/1970 | Johnson | 111/7 |
| 1,034,285 | 7/1912 | Olsson | 239/198 |
| 2,518,990 | 8/1950 | Keener | 239/199 |
| 3,643,442 | 2/1972 | Houston | 111/1 |

*Primary Examiner*—Robert E. Pulfrey
*Assistant Examiner*—Eugene H. Eickholt
*Attorney*—Newton, Hopkins & Ormsby

[57] ABSTRACT

A method and apparatus for subsoil application of fluid soil conditioning medium, such as water, for use in subsoil irrigation. An application of fluid soil conditioning medium is applied to the subsoil of an area by traversing the area with a translatable fluid application means in a plurality of alternate paths of movement parallel arranged relative to each other, with each alternate path of movement being located adjacent to a preceding path of movement, whereby the plurality of paths of movement are collectively operable to completely cover a predetermined area in which a subsoil application of fluid soil conditioning medium is to be made. The fluid medium to be applied is delivered from a stationary supply source to the translatable application means during the traversing operation and is ejected through a plurality of openings made in the soil during the traversing movement, whereby the fluid can be delivered or ejected in the subsoil of the area being traversed. The system of subsoil irrigation or application of a fluid soil conditioning medium includes a stationary supply source, such as a well, with the well being operatively connected through reelable conduit means to an intermediate reel means supported on a translatable vehicle means and with the conduit means including an additional conduit portion operatively connected to the translatable fluid application means, with the translatable fluid application means including a plurality of horizontally spaced soil splitting shank means for making openings in the soil of the area being traversed and including pressure pumping means for applying the fluid delivered thereto through the openings in the soil to the subsoil of the area. The translatable vehicle means containing the reel means and the translatable vehicle means containing the soil splitting shank means and fluid applying means are controlled and operatively associated with each other whereby the fluid can be pumped in a continuous manner from the stationary supply source through the reelable conduit means and through the openings in the soil during the traversing operation of the area with the vehicle containing soil splitting shank means.

11 Claims, 9 Drawing Figures

Patented Aug. 21, 1973

INVENTOR
THOMAS J. FRAZIER
BY
Newton, Hopkins, & Ormsby
ATTORNEYS

Patented Aug. 21, 1973 3,753,409

METHOD AND APPARATUS FOR SUBSOIL IRRIGATION

BACKGROUND OF THE INVENTION

This invention relates to a method and apparatus for the subsoil application of a fluid soil conditioning medium. More particularly, this invention is directed to a method and apparatus for the subsoil irrigation of a given area through the progressive manipulation of translatable vehicle means while simultaneously transferring water used for irrigation from a stationary supply source to the translatable vehicle means used for the subsoil application of the water.

In southwestern United States and other similar regions, adequate irrigation of the soil has been an age old problem not heretofore completely solved by known methods. In hot, arid regions, above-ground sprinkling and spraying of the soil is almost useless, due to rapid evaporation, and ditch irriaation is usually not practical due to the unavailability of sufficiently large sources of water for this method.

If you asked an agricultural engineer to describe the perfect irrigation system, he would probably include these features; it would have to be low in cost, long life, minimum of labor requirements, and the capacity to operate from less than ideal water sources. There would be no pipes to move. Evaporation losses would be small, and you could get the right amount of water to the crops just at the right time.

The perfect irrigation system as described above has not been constructed yet. Of course many attempts have been made to provide effective irrigation means which would suit particular needs of certain crops and suitable for certain terrain characteristics and water supply sources.

Probably the first attempt at irrigation was to flood an area to be irrigated with water conveyed thereto by gravity from a water supply source, such as rivers or lakes. In some areas, a water supply source was not available and in these areas special canals have been constructed for use in conveying water from remote rivers and lakes. Special conduit means have been developed for transferring water from a canal to an area to be flooded. In the continued development of irrigation, especially suitable for row crops, the row crops were cultivated in such a manner that would allow water to flow along a small canal between adjacent rows. To convey water along canals between adjacent rows required that the terrain be almost level and that the canals be carefully constructed between these rows to allow effective flow of water therealong. Each of the above indicated methods of flooding an area either completely, or by row, for irrigation purposes is often not feasible in certain areas due to the terrain characteristics which would not permit such flooding irrigation and due to the extreme amounts of water required. The use of flooding irrigation methods described above permits considerable loss of water through evaporation.

In a continued development of irrigation, light weight pipe conduit means have been developed which will effectively convey water from a water supply source, either lakes, canals or a well means. Sprinkler means are operatively associated with the pipe conveying means for spraying water outwardly over a predetermined area relative to the conduit means. A number of sprinkler means would be located along the conduit means to completely cover a given area in a sprinkling operation. After a first area has been covered with water in a sprinkler irrigation system, the pipes and sprinkler means would be disassembled and moved to an adjacent area whereby the water could be applied thereto and this method of disassembling and moving the pipes would be repeated until the desired area has been completely covered with the desired amount of water for irrigation purposes. The use of movable conduit means with sprinkler means is expensive, time consuming and often results in damage to the crops to which the water is to be applied.

Some attempts have been made to support the conduit means and sprinkler means on a translatable supporting rig which could automatically move over a predetermined area and sprinkle water on the area during the translating movement. However, these support rigs are extremely complex in construction, expensive to manufacture and are limited in their operation to level terrain. Further, the use of a sprinkler irrigation system requires extreme amounts of water due to evaporation losses.

Some attempts have been made to provide subsoil irrigation since subsoil irrigation would eliminate evaporation losses thereby reducing the water requirements for use in irrigation. The prior art subsoil irrigation methods have utilized plastic pipe means buried underground, with the plastic pipe means having a plurality of small openings extending along the length of the pipe. Irrigation is effected by pumping water under pressure through the buried pipe means, which water will be ejected outwardly through the space openings into the subsoil of the area being irrigated. The use of buried pipes for subsoil irrigation is expensive and sometimes can be unreliable due to the pipes becoming damaged or obstructions developing therein which will prevent an effective flow of water as would be required for subsoil irrigation.

SUMMARY OF THE INVENTION

The above disadvantages of the prior art irrigation systems have been overcome by the present invention which basically includes a translatable vehicle means having a plurality of horizontally spaced soil splitting shank means. The translatable vehicle means is adapted to be progressively maneuvered over an area to be irrigated in alternate, adjacent parallel paths of movement, with water used for irrigation being pumped through reelable conduit means from a stationary water supply source to pressure pumping means located on the translatable vehicle means. The water is delivered from the pressure pumping means through conduit means operatively associated with each of the soil splitting shank means and is ejected into the subsoil of the area through openings located adjacent the lower portions of the soil splitting shank means.

An important feature of the present invention includes a second translatable vehicle means which has supported thereon a reel means. The reel means of the second translatable vehicle means is operatively connected to the first translatable vehicle by a reelable conduit element which is controlled from the second translatable vehicle means in a reeling operation to permit the first translatable vehicle means to maneuver in the plurality of alternate parallel paths of movement to cover the desired area. The second translatable vehicle reel means is connected by a first reelable conduit means to a stationary reel means located adjacent to the stationary water supply source.

It is therefore the primary object of this invention to provide a method of subsoil application of a fluid soil conditioning medium.

A further object of this invention is to provide a method and apparatus for applying a fluid soil conditioning medium to the subsoil of an area while traversing the area with fluid application means and continuously transferring fluid from a stationary supply source to the translatable application means.

Another object of this invention is to provide a subsoil irrigation system capable of irrigating an area from a stationary supply source with a translatable vehicle means.

Still another object of this invention is to provide an apparatus for use in the subsoil application of a fluid soil conditioning medium which will effectively open the ranslatable soil and eject fluid therethrough into the subsoil of an area.

Yet another object of this invention is to provide a translatable vehicle means capable of subsoil application of a fluid soil conditioning medium which will permit the translatable vehicle means to maneuver in progressive alternate parallel arranged paths of movement to cover a given area while remaining connected to a stationary fluid supply source.

A further object of this invention is to provide a translatable vehicle means having reel control means operatively associated therewith for controlling the operation of two portions of interconnected fluid conveying conduit means.

Another object of this invention is to provide a translatable vehicle supporting an operable reel means which can be operated in a reeling operation during translating movement of the vehicle means.

A still further object of this invention is to provide a subsoil irrigation system which is simple in operation, economical to manufacture, and reliable in performance.

Still other objects and advantages of the details of construction will become apparent after reading the following description of the illustrative embodiments with reference to the attached drawings wherein like reference numerals have been used to refer to like parts throughout the several figures.

DESCRIPTION OF THE ILLUSTRATIVE EMBODIMENTS

Referring now to the drawings, the present invention will be described with reference to a translatable fluid applying apparatus 100, a translatable reel means 200 and a stationary fluid supply means 300.

The function of the translatable fluid applying apparatus 100 is to provide a fluid application means adapted to be supported on a translatable vehicle means for use in applying a fluid soil conditioning medium, such as water, to the subsoil of a predetermined area in response to a traversing movement of the fluid application means over the predetermined area.

The function of the translatable reel means 200 is to provide reel means adapted to be supported on a translatable vehicle means with the reel means being operative for controlling the reeling and unreeling operation of a pair of conduit portions and wherein the conduit portions are operative for delivering a fluid soil conditioning medium from the stationary supply source 300 to the translatable fluid applying apparatus 100.

The function of the stationary fluid supply source 300 is to provide a source of fluid which can be delivered by pressure pumping means through reelable conduit means to the fluid applying apparatus 100.

Figure 3:
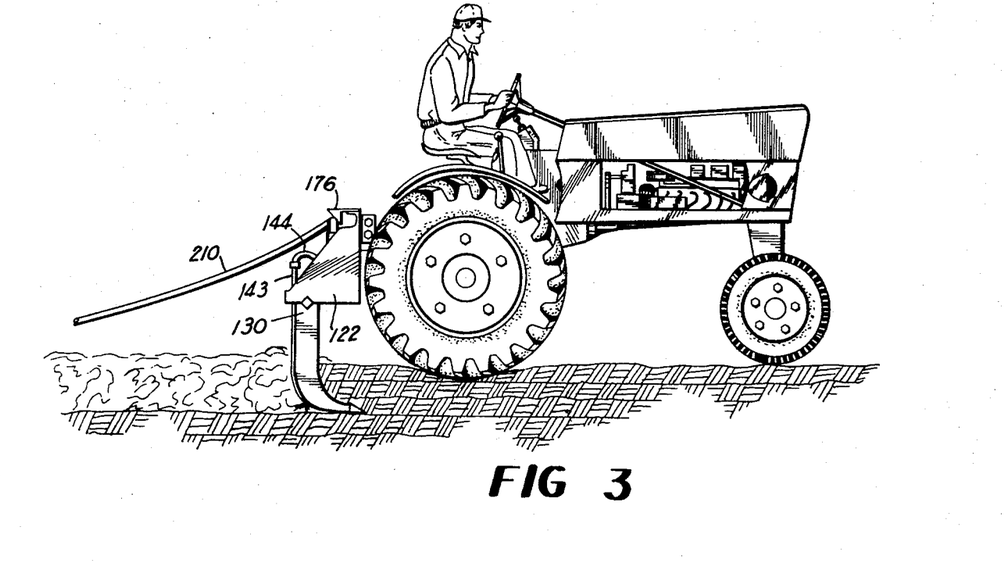
FIG. 3 is an elevational side view of a translatable vehicle means carrying the fluid applying apparatus.
Figure 4:
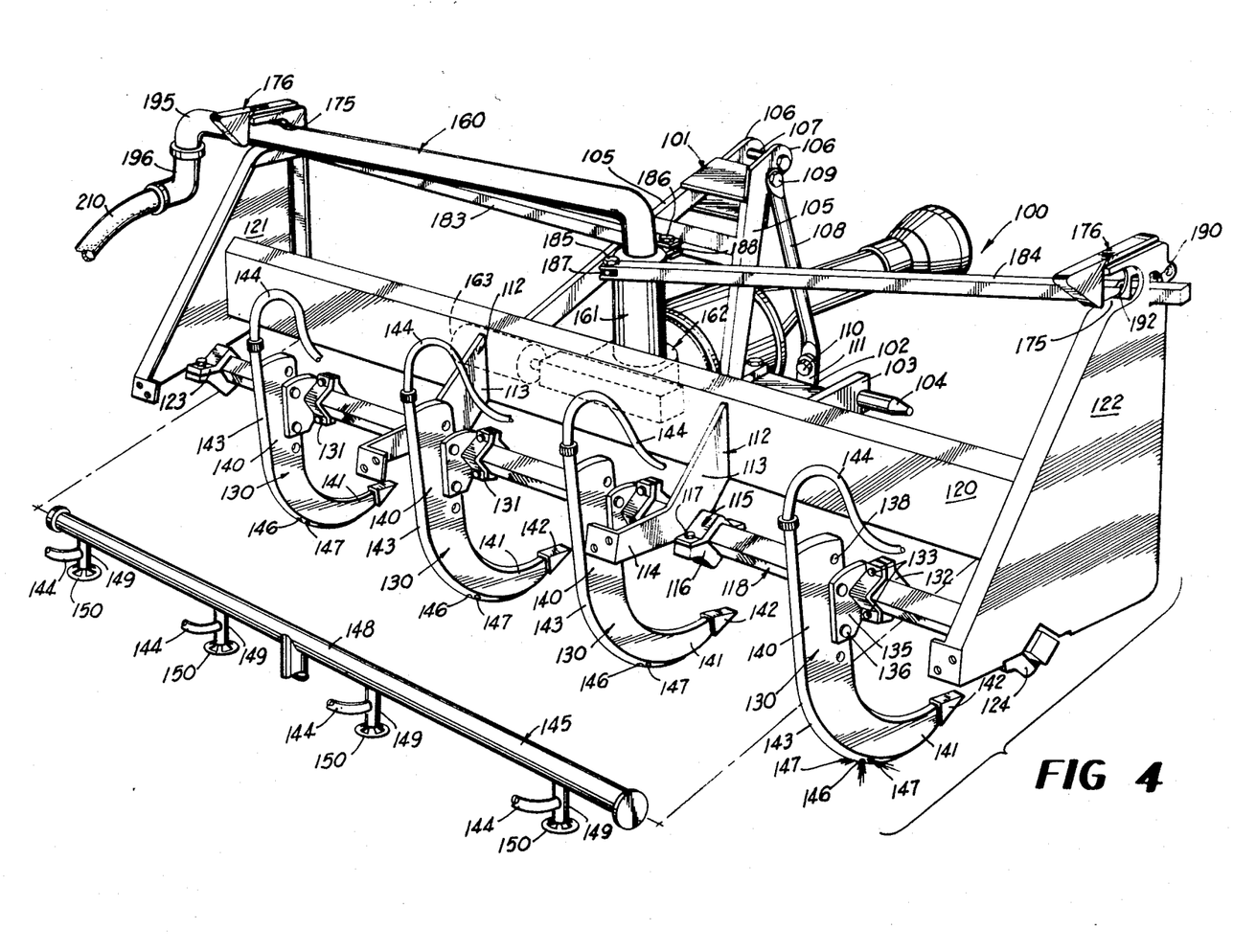
FIG. 4 is an enlarged exploded perspective view of the fluid applying apparatus shown in FIG. 3.
Figure 5:
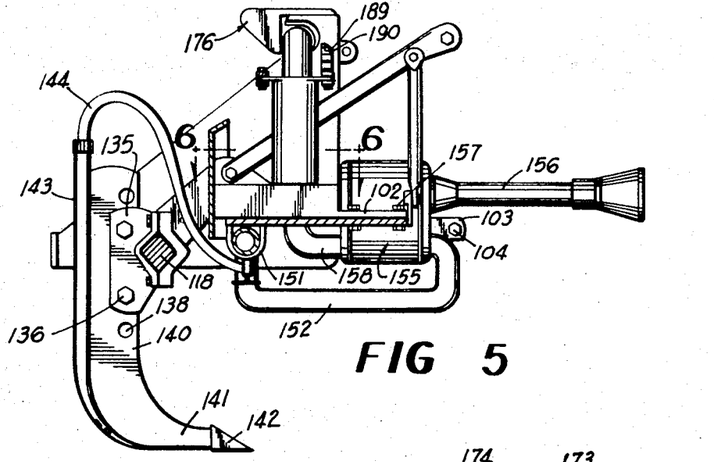
FIG. 5 is a vertical sectional view taken transversely through the fluid applying apparatus shown in FIG. 4, with certain parts omitted and certain parts broken away and shown in section for purpose of clarity.

Referring now particularly to FIGS. 3–8, the fluid application apparatus 100 includes a frame support means generally represented by the reference numeral 101. As shown in FIGS. 4 and 5, the frame support means includes a base supporting plate means 102. Connected along opposite lateral side edges of base plate 102 are a pair of fore and aft arranged vertically oriented plate elements 103, only one of which is shown in FIG. 4 (however it is to be understood that a duplicate plate element 103 would be provided on the left side of plate member 102). The forward end of the plate elements 103 are provided with coaxially arranged laterally extending connecting pins 104. The connecting pins 104 are adapted to be releasably secured to the bottom links of a conventional three-point linkage system provided to the translatable vehicle 10. A pair of forwardly converging vertically inclined plate elements 105 are connected to the rear edge of base plate 102 adjacent opposite lateral side edges thereof, by conventional means such as welding (not shown). The forwardly converging plate elements 105 terminate into a pair of spaced parallel arranged forwardly extending portions 106. The forwardly extending parallel arranged portions 106 provide a support for a connecting pin 107. Connecting pin 107 is provided for releasable connection to the upper link of the above mentioned conventional three-point linkage system.

As shown in FIGS. 4 and 5, a pair of bracing link means 108 are operatively connected between the base plate 102 and forwardly converging upwardly inclined plate elements 105. Only one of the bracing links 108 is shown in the drawing, however it is to be understood that a similar bracing link 108 would be provided on the left side of the framework support means. The bracing link 108 is connected to the forwardly converging plate element 105 by a conventional threaded connecting bolt 109 adjacent an upper end thereof and is connected to the base plate 102 by a conventional threaded connecting bolt 110. The connecting bolt 110 is secured within an upstanding tab portion 111. Tab portion 111 is welded in a vertically oriented position adjacent the forward edge of base plate 102.

As shown in FIGS. 4 and 5, a pair of horizontally spaced rearwardly extending support brackets 112 are secured to the rear edge of the base plate 22 and plate elements 103. The frame support brackets 112 are secured to the base plates 102 and frame elements 103 by conventional means, such as welding (not shown). Each of the frame support brackets 112 includes a downwardly angled portion 113 and a horizontally extending portion 114. A supporting clamp means 115 is secured to the lower edge of each of the support brackets 112 on outside lateral side edges thereof. The supporting clamp means 115 are secured to the support brackets 112 by conventional means, such as welding. Each of the supporting clamp means 115 includes a clamping element 116 adapted to be adjustably secured to the supporting clamp means 115 by means of conventional threaded connecting means 117. The clamp elements 115, 116 are detailed to define therebetween a substantially rectangular opening adapted to receive a conventional rectangular-shaped tool bar support member 118.

A horizontally extending angle plate member 120 is connected to the frame work support means 101 adjacent the rear edge of the base support plate member 102. The horizontally extending plate 120 extends laterally outward a predetermined distance on opposite sides of the plate support brackets 112. Secured to the opposite end of the angle plate member 120 is a pair of vertically oriented housing members 121, 122. Each of the housing members 121,122 has secured thereto adjacent a lower edge thereof a conventional clamping means 123,124. The clamping means 123,124 define substantially rectangular openings extending therethrough which are complementary to the tool bar support member 118. The clamping members 123, 124 are adapted to be adjustably clamped to the tool bar 118 by conventional threaded connecting means (not shown). As shown in FIG. 4, a plurality of soil splitting shank members 130 are secured in horizontally spaced relationship to the tool bar support means 118. The soil splitting shank members 130 are secured to the tool bar support member 118 by respective clamping members 131. Each of the clamping members 131 include a first clamping element 132 and a second clamping element 133. The two clamping members 132,133 defne a substantially rectangular opening extending therethrough which is complementary to the tool bar member 118. The clamping elements 132, 133 are clamped in a set position on the tool bar support member 118 by threaded connecting members 134. Extending rearwardly from the clamp support element 133 is a vertically oriented plate element 135 having a plurality of horizontally extending openings formed therein. The soil splitting shank member 130 is secured to the vertical plate element 135 by conventional threaded connecting means 136 which are adapted to be inserted through the openings in the plate element 135 and through aligned vertically spaced openings 138 in the soil splitting shank member 130. The vertically spaced openings 138 will permit vertical adjustment of the soil splitting shank member 130 relative to the supporting plate 135.

As shown in FIGS. 3–5, the soil splitting shank members include a substantially vertically oriented portion 140 and a forwardly curved tip portion 141. The forward edge of curved tip portion 141 is provided with a conventional replaceable cutting tip 142. Fixed to the rear edge of each of the soil splitting shank members 130 in a conduit member 143. The conduit members 143 extend vertically upward along the rear edge of the coil splitting shank members and are connected by a branch supply line 144 to a dispensing manifold means 145. The dispensing manifold will be described in more detail hereinbelow. A plurality of openings are formed in the conduit member 143 adjacent the lower edge thereof. The openings include a rearwardly extending opening 146 and a pair of laterally extending openings 147. The openings 146, 147 are adapted to dispense water or other suitable fluid therethrough into the openings in the subsoil of an area made by the soil splitting shank members 130.

As shown in FIG. 4, the dispensing manifold 145 is constructed of an elongated conduit member 148 having a plurality of fluid dispensing valve means 149 operatively associated therewith. The valve means 149 are adapted to be connected to the branch supply lines 144 for transferring fluid therethrough to the conduit members 143. The valve members 149 include a conventional adjustable control means 150 which will permit the valve means 149 to be moved from an open position to a plurality of adjusted positions or to a completely closed position which will permit various combinations of the valve means 149 to be operable for dispensing fluid therethrough to a combination of the soil splitting shank members 130.

As shown in FIG. 5, the dispensing manifold 145 is secured to the lower surface of the mounting plate 102 by conventional U-bolt connecting means 151. Fluid is delivered to the dispensing manfold 145 by a supply conduit 152. The supply conduit 152 is in flow communication with the dispensing manifold 145 adjacent one end and is in flow communication with a conventional pressure pumping means 155 adjacent an opposite end. The pressure pumping means 155 is adapted to be driven in a conventional manner for developing pressure on flud introduced thereto by a conventional power take-off drive means 156. The power take-off drive means 156 is adapted to be connected to a conventional power producing drive means of the support vehicle 10 whereby the pressure pump means 155 can be operated for developing pressure on fluid introduced thereto and for delivering the fluid under pressure to the supply conduit 152 and into the dispensing manifold 145. The pressure pumping means 155 is supported in a notched-out area provided in the horizontal support plate member 102. The pressure pump means is secured in a set position relative to plate 102 by a number of conventional threaded connecting means 157.

As shown in FIG. 5, input supply fluid is introduced to the pressure pump means 155 by a conduit member 158. Fluid is introduced into the supply conduit 158 through an angularly adjustable input supply line 160. The input supply line 160 is connected in fluid flow hermetically sealed relationship relative to the supply conduit 158. The supply conduit 160 is adapted to be angularly adjusted through approximately 180° relative to the frame support means 101 whereby the input supply conduit 160 can be selectively moved from a position extending laterally outward adjacent one side edge of the frame support means to a position extending laterally outward on the opposite side of the frame support means. The input supply conduit 160 is supported in hermetically sealed relationship within an adjustable collar means 161.

Figure 1:
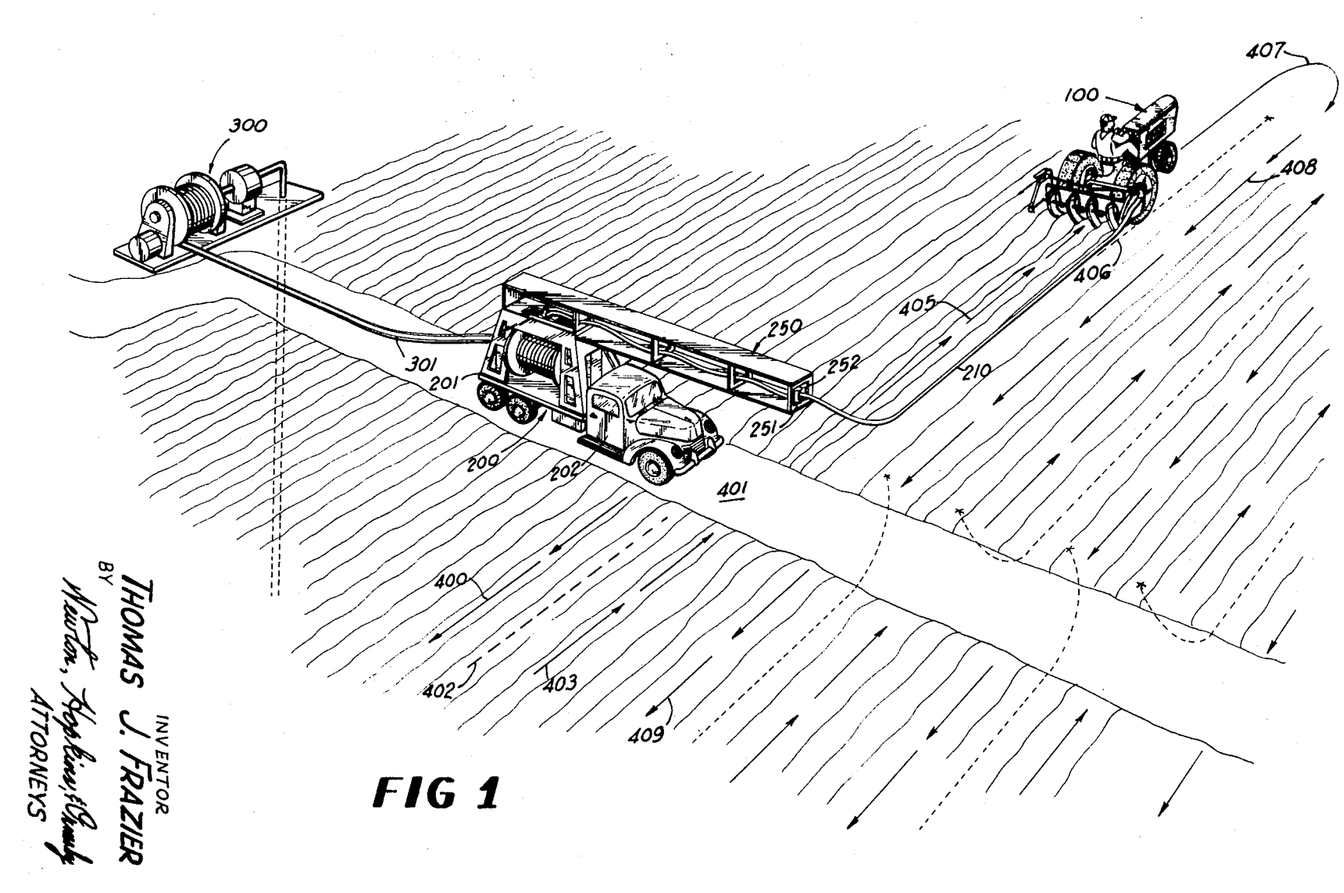
FIG. 1 is a perspective layout showing a stationary fluid supply source, translatable reel means and translatable fluid applying apparatus operatively connected to each other to form a system for carrying out the method of subsoil irrigation embodying the principles of the present invention.
Figure 6:
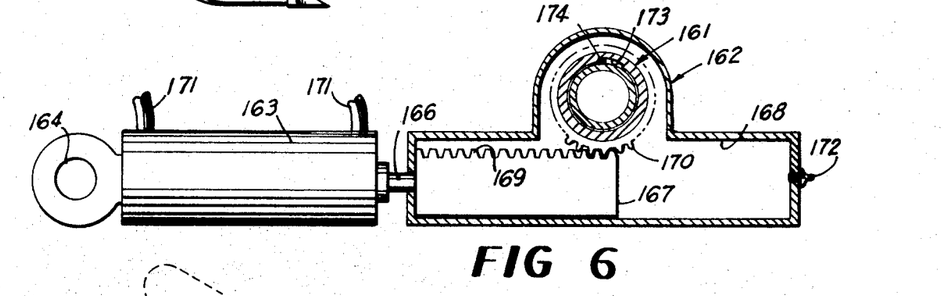
FIG. 6 is an enlarged fragmentary sectional view taken along line 6—6 of FIG. 5, with certain parts omitted for purpose of clarity.

As shown in FIGS. 4 and 6, collar 161 is supported for rotary movement within an actuating assembly 162. Actuating assembly 162 is supported on the upper surface of horizontal support plate member 102 as shown in FIG. 5. The actuating assembly 162 includes a conventional hydraulic cylinder means 163. Cylinder 163 is connected adjacent its base end 164 to the support frame work at 165. Cylinder 163 includes a conventional reciprocally operable piston rod 166 having its extended end connected to a reciprocating rack member 167. Rack member 167 is supported for reciprocating movement within an elongated housing element 168. Rack 167 includes a series of gear teeth 169 supported for enmeshing relationship with a spur gear 170. Spur gear 170 is fixed to te adjustable collar 161 adjacent a lower portion thereof. Operation of the hydraulic cylinder 163 is controlled by conventional hydraulic supply means provided on the translatable support vehicle 10 and will furnish a supply of fluid operating pressure through the supply lines 171 for effecting a reciprocating movement of rack member 169 which will effect a corresponding rotation of the gear 170 and adjustable collar 161. As shown in FIG. 6, conventional lubricating means 172 is provided adjacent one end of the housing 168 for lubricating the reciprocating rack member 167 and spur gear drive means 170. The reciprocating rack 167 and spur gear 170 is detailed in driving relationship such that with the cylinder 163 in a retracted position, as shown in FIG. 6, the collar 161 will be adjusted to the position shown in FIG. 4 with the input supply conduit 160 extending to the left lateral side of the support frame means 101. Movement of the hydraulic cylinder 163 to an extended position will effect a translating movement of the rack member 167 rightward within the support housing 168. Movement of the rack member 167 rightward will effect a counterclockwise rotation of the gear 170 and adjustable collar 161. A counterclockwise movement of the collar 161 will rotate the input supply conduit 160 from the leftward extending position, as shown in FIG. 4, to a rightward extending position, as shown in FIG. 1. The extent of movement of the rack 167 and gear 170 is detailed for effecting approximately 180° rotation of the collar 161. As shown in FIG. 6, the adjustable collar 161 includes an inwardly directed arcuate slot 173 which is in engagement with a radially extending key member 174 provided on the input supply conduit 160. The dimensions of the slot 173 and key member 174 is detailed for allowing a limited relative movement between the collar 161 and the input supply conduit 160, for the purpose of unlatching releasable latch means as will be described hereinbelow.

Figure 7:
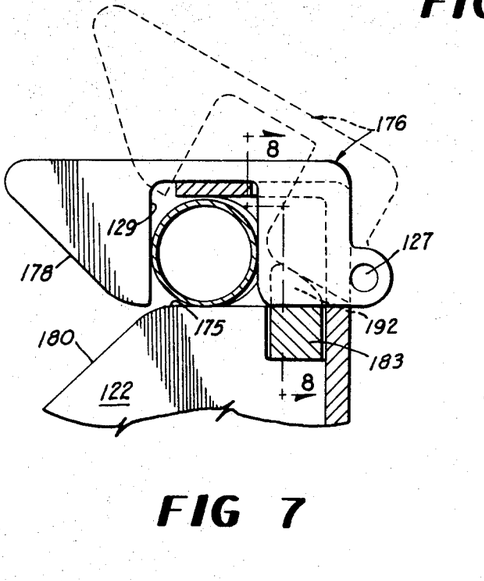
FIG. 7 is an enlarged fragmentary vertical sectional view showing one of the releasable latch means for supporting and latching the adjustable conduit means of the fluid applying apparatus.
Figure 8:
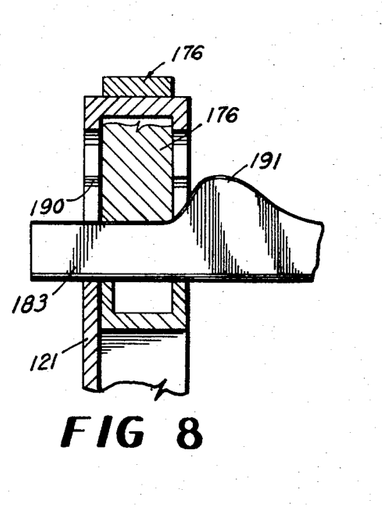
FIG. 8 is a vertical sectional view taken along line 8—8 of FIG. 7.

As shown in FIGS. 4, 5 and 7, the input supply conduit 160 is supported in the two above indicated laterally adjusted positions within a rearwardly directed notch 175 formed on the upper edge of tee framework housing members 121, 122. The rearwardly directed notches 175 are detailed for receiving and supporting the input supply conduit 160 when moved to the two laterally adjusted positions. The conduit 160 is secured in a latched position within the rearwardly directed notches 175 by a releasable latch element 176. As shown in FIG. 7, the releasable latch member 176 is pivotally supported about a horizontal pivot means 177 for movement between a lower limit latch position as shown in solid lines of FIG. 7 and is adapted to be moved to an upward latch releasing position, as shown in dotted line of FIG. 7. The latch element 176 is provided with a forward edge having an angularly disposed camming surface 178. Formed intermediate the latch element 176 is a downwardly opened latching recess 179. The latching recess 179 is detailed in dimensions for receiving and retaining the input supply conduit 160 therein, when the latching element is in the downward limit position. As shown in FIGS. 4 and 7, the housing members 121, 122 are provided with an upwardly angled surface 180 which cooperates with the downwardly angled surface 178 of the latching members to provide converging surface portions which will act as cam members. The angled surface portion 180 of the housing will contact and effect a camming movement of the conduit 160 into the rearwardly directed notch portion 176. Movement of the conduit 160 into the rearwardly directed notches 175 will contact the angled surface 178 of the latching element 176 to thereby cam the latch 176 to the upwardly displaced non-latching position, to permit the conduit to enter the rearwardly directed notch 175.

In order to effect a release of the latch elements 176 during adjusting movement of the collar 161, a pair of elongated latch releasing link members are provided for effecting movement of the latch elements 176 from their latched positions to their unlatched positions. The elongated link members 183, 184 are connected adjacent one end and by pivot connecting means 185, 186 to radially extending brackets 187, 188 formed on an upper edge of the collar 161. An opposite end of the links 183, 184 are slidably supported within laterally extending openings 189 (FIG. 5) and 190 (FIGS. 4 and 7) provided in housing members 121, 122. Each of the elongated latch releasing link members 183, 184 is provided with a cam element 191, 192 respectively. Links 183, 184 with cam members 191, 192 are detailed in supported relationship whereby a reciprocating movement of the links will effect a camming engagement of the cam elements 191, 192 with a bottom surface portion of the latch elements 176, to effect pivotal movement of the latch elements 176 from their lower latched positions, as shown in solid lines of FIG. 7, to their upward latch releasing positions, as shown in dotted lines of FIG. 7. A rotary adjusting movement of collar 161 will automatically effect a reciprocating movement of the latch releasing link members 183, 184 to effect a camming displacement of the latch elements 176 to their released positions. The relative motion connection between the inwardly directing arcuate slot 173 and key 174 of the adjusting collar and conduit element 160 will permit the latch releasing link 183, 184 to effect movement of the latch elements 176 to their latch releasing position before initiating a swinging movement of the input supply conduit 160 from one lateral extending position to an opposite lateral extending position.

The input supply conduit 160 includes a downwardly turned end portion 195 which has supported thereon a pivotally mounted swivel elbow connection 196. The elbow connection 196 is adapted to be connected to reelable conduit means as will be described in more detail hereinbelow. The swivel elbow 196 is hermetically sealed relative to the downwardly turned conduit portion 195, but will permit pivotal movement relative thereto during a swinging movement of the input supply conduit 160 from one laterally extending position to an opposite laterally extending position.

The method of operating the above described fluid application apparatus will be described in more detail hereinbelow in the description of the method and operation of the system embodying the principles of the present invention.

Figure 9:
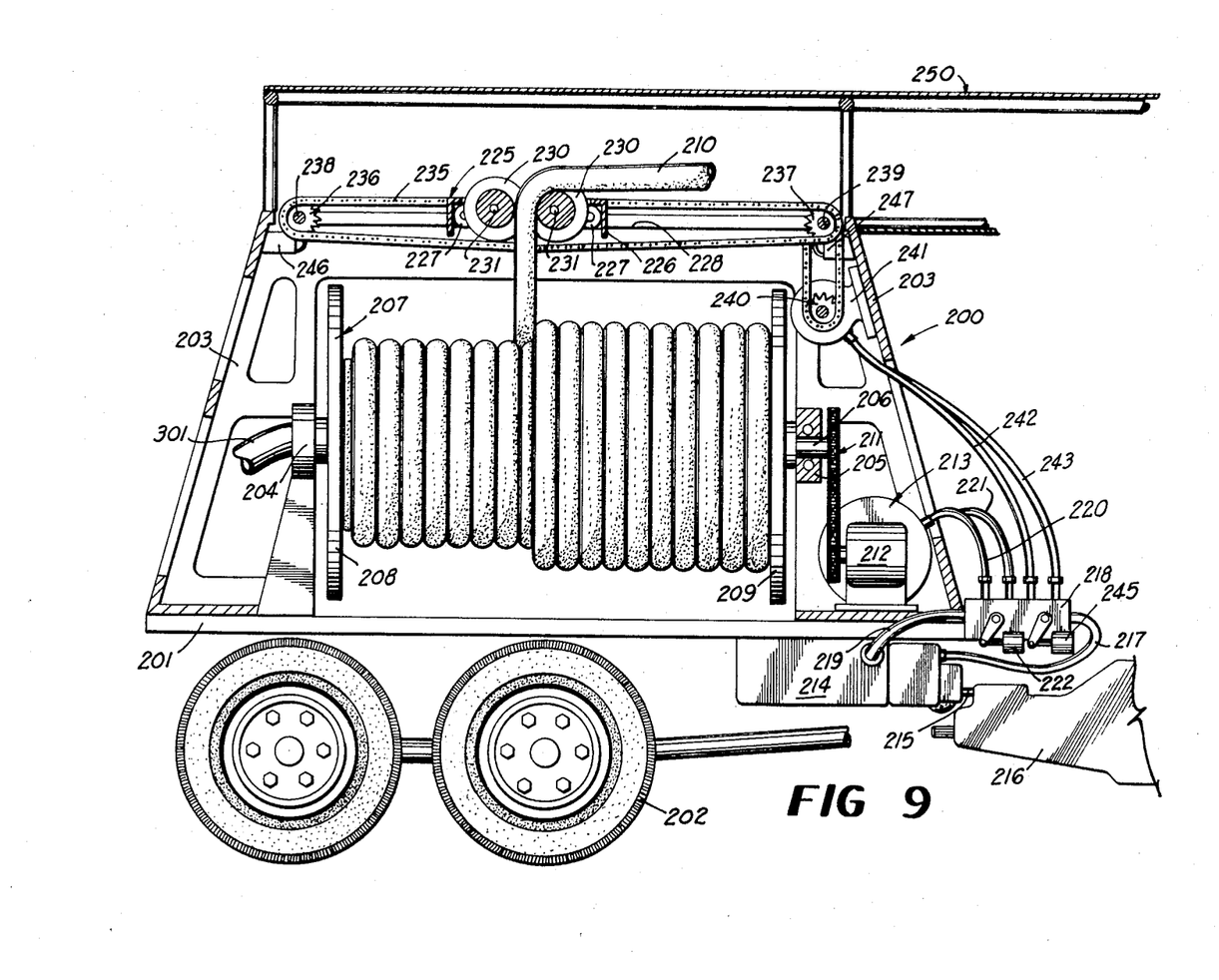
FIG. 9 is an enlarged fragmentary vertical sectional view taken longitudinally through the translatable reel means shown in FIGS. 1 and 2, with certain parts being omitted and certain parts broken away and shown in section for the purpose of clarity.

Referring now particularly to FIGS. 1 and 9, the translatable reel means 200 is adapted to be supported on the bed 201 of a conventional truck vehicle means 202. Reel means 200 includes a supporting framework 203 which provides a pair of coaxially aligned bearing support members 204,205. The bearing support members 204, 205 are detailed for supporting shaft 206 of a reel spool element 207. The reel spool element 207 includes a conventional drum portion (not shown) and a pair of axially spaced radially extended flanges 208, 209. The reel drum portion and flanges 208, 209 are adapted to reelably support a conduit portion 210. Rotary movement of the reel 207 is provided by means of a chain and sprocket drive means 211 which is operatively connected to a gear box drive means 212. The gear box drive means 212 is driven by a conventional hydraulic motor drive means 213. Hydraulic motor drive means 213 is controlled by a conventional hydraulic pump means 214 supported on an underside of the vehicle bed means 201. Th hydraulic pump means 214 is driven by a power take-off drive member 215 from the vehicle transmission means 216. The hydraulic pump means 214 includes a high pressure line 217 which is connected with a valve control assembly 218 and includes a return line 219 which is in communication with the valve assembly 218 and the hydraulic pump means 214 for returning the supply of hydraulic fluid to reservoir means (not shown) associated with the hydraulic pump means 214. Hydraulic fluid is delivered from the valve assembly 218 along supply lines 220, 221 to the reversible hydraulic motor 213. A solenoid control valve means 222 is provided on the valve assembly 218 for effecting a reversing operation of the rotary hydraulic motor 213 which will in turn effect a reversing movement of the reel means 207.

As shown in FIG. 9, the supply conduit 210 is supported for tracking movement above the reel means 207 by a carriage assembly 225. The carriage assembly includes a supporting frame work 226 having a number of support wheel means 227 rotatably supported thereon and detailed for rolling engagement with track means 228 provided on the reel supporting framework 203. The carriage assembly 225 includes a pair of roller guide elements 230 supported for rolling movement about spaced parallel arranged axis 231. The roller guide elements 230 are formed with a shaped surface which will retain the conduit 210 therebetween but will permit movement of the conduit 210 relative thereto in a reeling and unreeling operation of the reel assembly 207. The carriage assembly 225 is provided for controlling the axial windup of the conduit 210 on the reel assembly 207, whereby the conduit 210 will be wound around the drum throughout the axial dimensions of the drum and will be permitted to unwind therefrom. The carriage assembly 225 will be moved axially above the reel means 207 along a path substantially parallel to the axis of the drum. Movement of the carriage assembly 225 is effected by a chain member 235 which is supported adjacent one end of the reel frame means 203 by a first sprocket 236 and is supported adjacent an opposite end by a sprocket member 237. The sprockets 236, 237 are supported for rotary movement about a cross support shaft 238, 239. The cross support shafts 238, 239 are rotatably supported on the framework 203 by conventional bearing means (not shown).

As shown in FIG. 9, a rotary movement of sprocket 237 is effected by a means of a sprocket and chain drive assembly 240. The sprocket and chain drive assembly 240 is rotated by means of a conventional reversible hydraulic motor means 241. The hydraulic motor means 241 is controlled by means of a pair of fluid hydraulic supply lines 242, 243 which are operatively connected to the valve assembly 218. The hydraulic motor drive means 241 is operable for driving the sprocket 237 in either a clockwise or counterclockwise direction to control a reciprocating movement of the carriage assembly 225 above the surface of the reel means 207. The hydraulic motor drive means 241 is controlled by a solenoid actuated valve control means 245. The solenoid operated valve control means 245 is operated by a pair of limit switches 246, 247. Limit switches 246, 247 are supported on the reel framework means 203 in a position to be contacted by movement of the carriage assembly 225. Movement of the carriage assembly 225 to the extreme leftward position will contact the limit switch 246 which will effect an operation of the solenoid control valve means 245 to thereby reverse the direction of drive from the hydraulic motor 241. Movement of the carriage assembly 225 to the extreme rightward position will contact the limit switch means 247 which will again energize solenoid control valve means 245 to again reverse the direction of the hydraulic motor drive means 241.

As shown in FIGS. 1 and 9, the reel supporting framework 203 includes an elongated boom support structure 250. The elongated boom support structure 250 includes a forwardly extending end which extends above and in front of the truck vehicle means 202. The forwardly extended end of the boom structure 250 is provided with a pair of roller guide elements 251, 252.

As shown in FIG. 4, the extended end of the reel supply conduit 210 is connected to the swivel connecting member 196 of the fluid application apparatus. An input supply into the reel assembly 207 is provided through a supply conduit 301. The input supply conduit 301 is extended axially into the reel assembly 207 and is connected in fluid flow communication with the conduit 210 in a conventional manner whereby fluid can be pumped through the supply conduit 301 and outwardly through the supply conduit 210. The reeling and unreeling operation of the translatable reel means 200 will be described in more detail hereinbelow in the description of the operation of the system.

Figure 2:
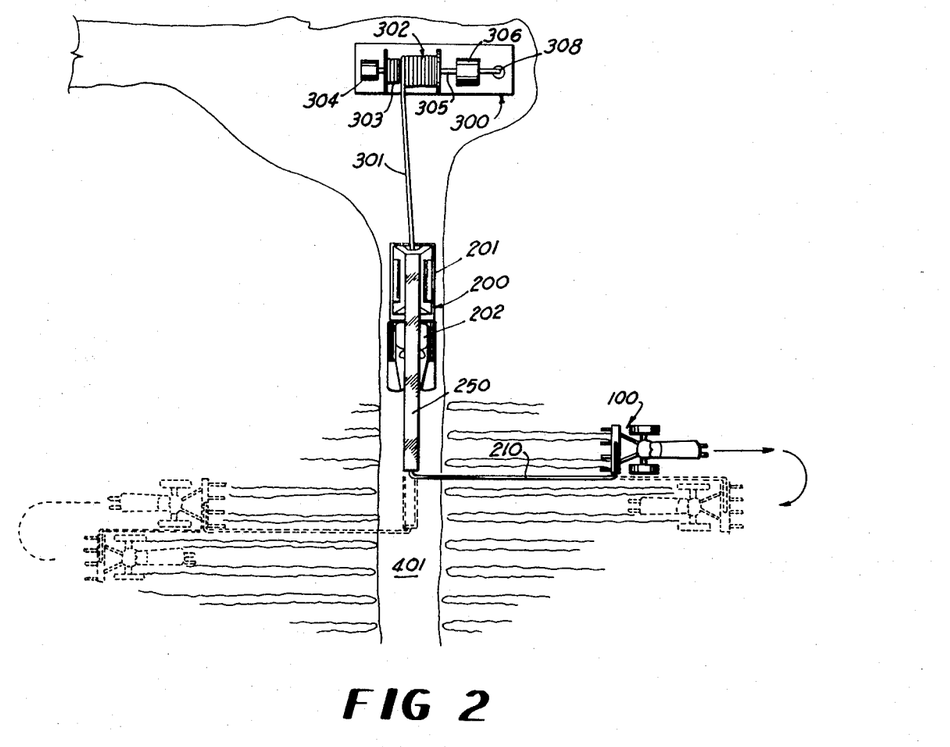
FIG. 2 is a horizontal schematic view of an area in which a subsoil application is to be made illustrating the paths of movement of the fluid applying apparatus relative to a given area.

As shown in FIGS. 1 and 2, the input supply conduit 301 is connected to a stationary reel assembly 302. The stationary reel assembly 302 includes a conventional reel drum 303 for reeling and unreeling the supply conduit 301. Rotary movement of the reel drum 303 is controlled by a conventional motor drive means 304. A supply of fluid is directed to the reel assembly 302 by a supply conduit portion 305. The supply conduit portion 305 is connected to a conventional pump means 306. Fluid is supplied to the pump means 306 from a conventional drilled well means 308. The drilled well means 308 will supply a quantity of water to the pump means 306 which will force the water under pressure through the supply conduit 305 outwardly through the supply conduit 301 into the translatable reel assembly 200. The water pressure forced outwardly through the conduit 301 will pass through the reel assembly supply conduit 210 and will be delivered by the conduit 210 through the input supply conduit 160 to the pressure pumping means 155. The water is delivered to the pressure pump means 155 and will be increased in pressure and delivered through conduit 152 into the dispensing manifold 145. Water under pressure in the dispensing manifold 145 will then be directed along the branch supply conduits 144 to the conduit members 143 supported on the rear or trailing edge of the soil splitting shank members 130. Water entering the conduit portions 143 under pressure will be ejected outwardly through the openings 146, 147 into openings formed in the soil by the soil splitting shank member 130.

Referring now particularly to FIGS. 1 and 2, the above described fluid applying apparatus 100, translatable reel means 200 and stationary water supply source 300, can be utilized to carry out the method of irrigation embodying the principles of the present invention, by traversing the area in which the subsoil irrigation is to be made. The traversing operation of the area in which the subsoil irrigation is to be made will follow a pattern of alternate parallel arranged paths of movement with the each subsequent path of movement being adjacent a proceeding path of movement. As shown in FIG. 1, the first path of movement of the fluid application apparatus is represented by a series of solid arrow lines 400 which extend from the left of a vehicle roadway means 401. Movement of the fluid application apparatus 100 along the path of arrows 400 are detailed such that the supply conduit 210 will follow the path of the dotted lines 402. After the fluid application apparatus 100 has reached the end of the path of movement 400, the vehicle will be maneuvered through a 180° steering operation to cause the vehicle to move along an alternate path arranged parallel to path 400. The alternate path is represented by a series of arrows 403. During a steering movement of the fluid application apparatus from the path 400 to the path 403, the fluid input supply conduit 210 will cause the swivel connection 196 to rotate through approximately 180° relative to the downwardly turned elbow portion 195 of the input supply conduit 160. During a traversing operation of the fluid application apparatus along the path represented by arrows 403, the supply conduits 210 will remain located in the paths represented by the dotted lines 402. As the translating fluid application apparatus moves in the direction of the roadway 401, the translatable reel assembly 200 will effect a reeling operation of the conduit 210 to progressively shorten the conduit and to keep the conduit reeled up as the fluid application apparatus approaches the roadway. During movement of the translatable fluid application apparatus 100 along path 400, the soil splitting shank members 130 are lowered into position in engagement with the ground by conventional life control means associated with the three point linkage of a supporting vehicle 10. In a lowered position, as shown in FIG. 3, the soil splitting shank members 130 will make a corresponding number of openings in the soil whereby the water pumped under pressure through the conduit means as described above can be ejected through openings 146, 147 into the openings made in the soil.

The soil splitting shank members 130 will be elevated to a position above the ground during a steering movement of the translatable fluid application apparatus from the path 400 to the path 403. After the fluid application apparatus approaches the roadway 401, the soil splitting shank members 130 will again be adjusted to an elevated position above the ground and the translatable fluid application apparatus 100 will move across to an opposite side of the roadway 401 and will again lower the soil splitting shank members 130 into engagement with the ground and will progress along a path represented by arrows 405. However, during movement of the fluid application apparatus across the roadway 401, the hydraulic control cylinder 163 will be operated to effect a swinging movement of the input supply conduit 160 from the leftward extended position shown in FIG. 4 to a rightward extended position shown in FIG. 1. As the fluid application apparatus progresses outwardly along path 405, the supply conduit 210 will be allowed to unreel from the reel assembly 207 and will track along a path represented by dotted lines 406.

After the fluid application apparatus reaches the end of path 405, the soil splitting shank members 130 will be elevated to a position above the ground and the vehicle will be maneuvered through a 180° steering movement represented by circular arrow 407, which will position the translatable fluid application apparatus for movement along an alternate path 408. Path 408 will be adjacent to and substantially parallel to path 405. During a steering movement of the translatable fluid application apparatus from path 405, to path 408, the input supply conduit 210 will again rotate about swivel connection 196 which will allow the conduit 210 to remain in the path represented by dotted lines 406. As the fluid application apparatus 100 progresses along path 408, the reel assembly 207 supported on the translatable reel means 200 will again be operated to progressively shorten the length of conduit 210 during a leftward movement of the translatable fluid application apparatus along path 408.

As the translatable fluid application apparatus 100 approaches the roadway 401, along path 408, the soil splitting shank members 130 will again be elevated to a position above the ground and the support vehicle will progress across roadway 401 and lower the soil splitting shank members 130 again into engagement with the ground and will progress along a path represented by arrows 409. During movement of the translatable fluid application apparatus across roadway 401, the hydraulic control cylinder 163 will again be energized to effect a swinging movement of the input supply conduit 160 from the rightward extending position to the leftward extending position to allow the supply conduit to track along the path represented by dotted lines 410. During each of the swinging movements of the input supply conduit 160 by the control cylinder 163, the translatable vehicle 202 will be moved forward a distance corresponding to the space between the above indicated alternate paths of movement. The translatable reel assembly will be detailed in location to allow the forward edge of the boom guide roller means 151, 152 to be positioned in substantial alignment with the tracking path of the conduit member 210. The maneuvering of the fluid application apparatus 100 and translatable reel support means 200 will take a cooperative operation on the part of the operator of each of the vehicles.

As the operator of the translatable fluid application apparatus continues to traverse the area in which the subsoil irrigation is to be made, the translatable fluid application apparatus will follow a number of alternate paths of movement with each path of movement being adjacent a preceding path of movement and with the paths of movement being substantially parallel to each other. The operator of the fluid application apparatus 100 will continue the traversing of the area until the number of alternate paths of movement have collectively covered the entire area in which a subsoil irrigation is to be made.

During the forward movement of the translatable reel means 200 the conduit member 301 will be unreeled from the reel assembly 303. The reel assembly 303 can either be controlled by an operator located at the stationary reel assembly 300 or can be controlled remotely by the operator of the translatable reel means 200.

After the translatable reel means 200 has reached the end of the roadway 401 in a subsoil irrigation operation, the translatable reel conduit means 210 can be disconnected from the swivel connection 196 and reeled inwardly. Simultaneously with the inward reeling of conduit 210, the conduit 301 can be disconnected from the translatable reel means 200 and reeled inwardly on the reel assembly 303. After the area adjacent the stationary well supply source 300 has been irrigated, as described above, the translatable reel means 200 and translatable fluid application apparatus 100 can be moved to additional areas to be irrigated and the translatable reel assembly and fluid application apparatus can be again connected to each other and connected to an additional stationary supply source for irrigating still another area in a manner as described hereinabove.

Referring now particularly to FIG. 2, in a subsoil irrigation of an area in a manner as described above, the translatable reel assembly will move in a first direction along the roadway 401 to reel the supply conduit portion 301 from the stationary reel assembly 303. As the translatable reel assembly 200 progresses along the roadway 401, the translatable fluid application apparatus 100 will move in a number of alternate paths of movement parallel arranged relative to each other, with the paths of movement being collectively operable for covering the entire area in which a subsoil irrigation is to be made. Movement of the fluid application apparatus in a subsoil irrigation operation will cause the supply conduit portion 210 of the translatable reel assembly 200 to move along a path angularly disposed relative to supply conduit 301 and angularly disposed to the roadway 401.

As shown in FIG. 2, a movement of the fluid application apparatus 100 about a 180° steering movement will cause the fluid application apparatus to pivot relative to the supply conduit 210 about the vertical axis of the swivel connecting member 196, which vertical axis is substantially aligned with the path of movement of the conduit member 210 and will thus allow the conduit 210 to remain in the same path for reeling in during an alternate path of movement of the fluid application apparatus.

The embodiments of the present invention have been described for performing subsoil irrigation in which a supply of water is pumped from a stationary well means 308 through a translatable reel means 200 and to a translatable fluid apparatus 100. However, it is to be understood that the above described system and method of operation could be utilized for pumping fluid fertilizer or other soil conditioning medium from a stationary supply source to a translatable fluid application apparatus.

It now becomes apparent that the above described embodiments of the present invention are capable of obtaining the above stated objects and advantages. It is obvious that those skilled in the art may make modifications in the details of construction without departing from the spirit of the invention which is to be limited only to the scope of the appended claims.

What is claimed is:

1. A method of subsoil application of a fluid soil conditioning medium, including the steps of:
   a. traversing, with fluid application means, an area in which a subsoil application is to be made;
   b. making openings in the soil of said area in response to said traversing operation with said fluid application means;
   c. conveying a fluid soil conditioning medium from a stationary supply source to said application means during said traversing operation; and,
   d. applying said fluid soil conditioning medium through said openings into the subsoil of said area during said traversing operation,
   e. said openings including a plurality of horizontally spaced openings which are simultaneously made in the soil of said area during said traversing movement with said fluid application means, said openings being made by a plurality of horizontally spaced soil splitting shank means,
   f. said soil conditioning fluid being conveyed through first conduit means located on said soil splitting shank means and being ejected into the subsoil of said area through openings provided adjacent a lower portion of said soil splitting shank means;
   g. said fluid being pumped through second conduit means from said stationary supply source to said fluid application means during said traversing movement over said area, said second conduit means being operatively associated with reel means and said reel means being operatively associated with said traversing application means for effecting a reeling and unreeling of said second conduit means during said traversing operation of said area;
   h. said second conduit means comprising first and second portions, first reel means being provided which are operable during a subsoil application of said soil conditioning medium for moving said first portion in one direction, and second reel means being provided for moving said second portion in a direction angularly disposed relative to said first direction during said traversing operation whereby said traversing fluid application means can maneuver relative to said area to completely cover said area with said fluid soil conditioning medium.

2. A method of subsoil application of a fluid soil conditioning medium as described in claim 1 further characterized in that said first and second conduit portions include an intermediate reel means and wherein said intermediate reel means is operatively associated with said first and second conduit portions at the point of intersection of said angularly disposed directions.

3. A method of subsoil application of a fluid soil conditioning medium as described in claim 2 further characterized in that said intermediate reel means is supported on a translatable vehicle means and is operatively associated with said stationary supply source for unreeling said first conduit portion in said first direction and is operatively associated with said traversing application means for reeling and unreeling said second conduit portion in said second direction.

4. A system for use in the subsoil application of a fluid soil conditioning medium, said system including:
   a. a stationary fluid supply source;
   b. translatable vehicle means capable of traversing an area in which a subsoil application is to be made, said translatable vehicle means including means for making openings in the soil of said area in response to a traversing operation with said vehicle means, and wherein said vehicle means includes means for applying fluid through said openings to the subsoil of said area being traversed; and,
   c. means for conveying fluid from said stationary supply source to said vehicle fluid application means during a traversing operation of said area, whereby said fluid can be continuously transferred from said stationary fluid supply source to said translatable fluid applying means and through said openings into the subsoil of said area,
   d. said fluid being pumped through conduit means from said stationary source to said translatable vehicle means, and said subsoil conditioning medium being water used for the subsoil irrigation of said area,
   e. said conduit means including first and second portions, said first portion being operatively associated with said stationary supply source and said second portion being operatively associated with said translatable vehicle means,
   f. first reel means for moving said first portion in a first direction and second reel means for moving said second portion in a second direction angularly disposed relative to said first direction,
   g. said reel means permitting the reeling and unreeling of said conduit portions to change the length thereof during said traversing operation of said area.

5. A system for use in the subsoil application of a fluid soil conditioning medium as described in claim 4 further characterized in that said system includes reel means operatively associated with said first and second conduit portions adjacent an intersection point of said angularly disposed direction of movement, with said intermediate reel means being operable for controlling the length of said second conduit portion during said reeling operation.

6. A system for use in the subsoil application of a fluid soil conditioning medium as described in claim 5 further characterized in that said intermediate reel means operatively associated with said first and second conduit portions is supported on a translatable vehicle means.

7. A system for use in the subsoil application of a fluid soil conditioning medium as described in claim 4 further characterized in that said stationary fluid supply source includes first pressure means operatively associated therewith for conveying said fluid under pressure from said stationary supply source to said translatable fluid applying vehicle means and wherein said translatable fluid applying vehicle means includes second pressure means operatively associated therewith for ejecting said fluid through said openings into the subsoil of said area being traversed.

8. A system for use in the subsoil application of a fluid soil conditioning medium as described in claim 4 further characterized in that said translatable fluid applying vehicle means includes means operatively associated with said second portion of said conduit means whereby said fluid applying vehicle means can maneuver over said area in which a subsoil application of fluid medium is to be applied in progressive plural alternate paths of movement parallel arranged relative to each other, with said plural alternate paths of movement being collectively operable for covering the entire area in which a subsoil application of fluid media is to be made.

9. A system for use in the subsoil application of a fluid soil conditioning medium as described in claim 8 further characterized in that said translatable fluid applying vehicle means includes a plurality of horizontally spaced soil splitting shank means, with the horizontal dimensions of said plurality of said soil splitting shank means being operable for covering a predetermined area of said soil in one of said paths of movement and wherein said next alternate path of movement is located adjacent a preceding path of movement.

10. A method of subsoil application of a fluid soil conditioning medium, including the steps of:
   a. traversing, with fluid application means, an area in which a subsoil application is to be made;
   b. making openings in the soil of said area in response to said traversing operation with said fluid application means;
   c. conveying a fluid soil conditioning medium from a stationary supply source to said application means during said traversing operation; and,
   d. applying said fluid soil conditioning medium through said openings into the subsoil of said area during said traversing operation,
   e. said fluid soil conditioning medium being conveyed through a conduit having first and second parts;
   f. said first conduit part being provided with a first reel operable for moving said part in a first direction and said second conduit part being provided with a second reel for moving it in a second direction angularly disposed relative to said first direction;
   g. whereby the movement of said conduit parts about said reels permits maneuvering of said fluid application means to completely cover said area with said fluid soil conditioning medium.

11. A system for use in the subsoil application of a fluid soil conditioning medium, said system including:
   a. a stationary fluid supply source;
   b. translatable vehicle means capable of traversing an area in which a subsoil application is to be made, said translatable vehicle means including means for making openings in the soil of said area in response to a traversing operation with said vehicle means, and wherein said vehicle means includes means for applying fluid through said openings to the subsoil of said area being traversed; and,
   c. means for conveying fluid from said stationary supply source to said vehicle fluid application means during a traversing operation of said area, whereby said fluid can be continuously transferred from said stationary fluid supply source to said translatable fluid applying means and through said openings into the subsoil of said area,
   d. said conveying means comprising a conduit having first and second parts said first part being operatively associated with said stationary supply source and said second part being operatively associated with said translatable vehicle means;
   e. first reel means for moving said first part in a first direction and second reel means for moving said second part in a second direction angularly disposed relative to said first direction,
   f. said reel means permitting the reeling and unreeling of said conduit parts to change the length thereof during said traversing operation and to permit said translatable vehicle means to cover all parts of an area.

* * * * *